United States Patent Office 3,792,118
Patented Feb. 12, 1974

---

3,792,118
RESIN COMPOSITION COMPRISING STYRENE RESIN AND A POLYARYLENE ESTER
Hiroshi Kishikawa, Kiyoshi Yasuno, Shuji Kitamura, Katsuji Ueno, Haruo Inoue, and Nobuhiro Toyota, Osaka, Japan, assignors to Sumitomo Chemical Company, Limited, Osaka-fu, Japan
No Drawing. Filed Mar. 8, 1972, Ser. No. 232,901
Claims priority, application Japan, Mar. 8, 1971, 46/12,657
Int. Cl. C08g *39/10*
U.S. Cl. 260—873     3 Claims

ABSTRACT OF THE DISCLOSURE

A styrene resin composition resistant to heat deformation which comprises 1 to 95% by weight of styrene resin and 99 to 5% by weight of polyarylene ester on the basis of the total weight of the composition.

---

The present invention relates to a styrene resin composition having a resistance to heat deformation.

As is well known, styrene resin (hereinafter referred to as "SR") is an excellent material for molding, and various products are manufactured therewith in a large scale by the aid of a conventional molding machine. These molded products of SR are, however, readily deformed at a temperature higher than 100° C. For acquisition of a resistance to heat deformation, SR has heretofore been copolymerized with α-methylstyrene. But, this method is not satisfactory, because α-methylstyrene is exceedingly unstable to heat so that the copolymer prepared from SR and α-methylstyrene is apt to be decomposed by heat.

As the result of extensive studies, it has now been found that an excellent resistance to heat deformation can be obtained by blending SR with polyarylene ester (hereinafter referred to as "APC") without deterioration of the physical properties and processability of SR.

The composition of the present invention comprises about 1 to 95% by weight of styrene resin and about 99 to 5% by weight of APC on the basis of the total weight of the composition. Particularly preferred is about 15 to 95% by weight in the content of APC.

The said quantitative limitation of APC in the composition is essential for assured realization of a high resistance to heat deformation while maintaining a favorable processability. When the amount of APC is less than 5% by weight, a sufficient resistance to heat deformation is not obtained. When the amount is higher than 99% by weight, the resulting resin composition becomes inferior in processability, and a higher temperature will be required for its processing.

As the styrene resin to be used in the composition, the following materials may be exemplified: e.g. acrylonitrile-styrene copolymer; a graft copolymer obtained by graft copolymerizing styrene to a rubbery high polymer such as a rubbery copolymer of butadiene with styrene, acrylonitrile or the like, a rubbery copolymer of ethylene and vinyl acetate, a rubbery copolymer of ethylene, propylene and diene or polybutadiene; a polystyrene composition comprising polystyrene and the rubbery high polymer as mentioned above; a graft copolymer obtained by graft copolymerizing styrene, acrylonitrile and/or methyl methacrylate to the rubbery high polymer as mentioned above; a resin composition comprising the rubbery high polymer as mentioned above and a styrene copolymer such as acrylonitrile-styrene copolymer or methyl methacrylate-styrene copolymer; etc.

The APC to be used in the composition is a polyester prepared from a divalent phenol or its derivative and an aromatic dibasic acid or its derivative.

The divalent phenol is represented by the following formula:

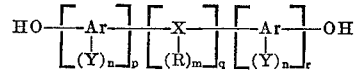

wherein Ar is an aromatic ring (e.g. phenylene, biphenylene, naphthylene), R is hydrogen, alkyl (e.g. methyl, ethyl), haloalkyl (e.g. chloromethyl, chloroethyl, bromoethyl), aryl (e.g. phenyl, naphthyl), haloaryl (e.g. chlorophenyl, bromophenyl), aralkyl (e.g. benzyl, phenylethyl), haloaralkyl (e.g. chlorobenzyl), alkyl-substituted aryl (e.g. tolyl, xylyl), alkyl-substituted haloaryl (e.g. chloromethylphenyl, bromomethylphenyl), cycloalkyl (e.g. cyclohexyl, cycloheptyl) or halocycloalkyl (e.g. chlorocyclopentyl, chlorocyclohexyl), X is alkylene (e.g. methylene, ethylene, propylene), alkylidene (e.g. ethylidene, propylidene, isopropylidene), a chain of two or more alkylenes or alkylidenes linked through an aromatic ring, a t-amino group, an oxygen atom, a carbonyl group or a sulfur-containing group (e.g. thio, sulfoxy, sulfone), an alicyclic group, a sulufur-containing group (e.g. thio, sulfoxy, sulfone), an oxygen atom, a carbonyl group or a t-amino group, Y is halogen, nitro or the group represented by R' or OR' (R' being the same as R), m is 0 or an integer not more than the number of hydrogen atoms replaceable on X, n is 0 or an integer not more than the number of hydrogen atoms replaceable on Ar, p is an integer of 1 or more, q is 0 or 1 and r is 0 or an integer of 1 or more, r being not 0 when q is 1.

In the above formula, when two or more substituents Y are present, they may be the same or different from each other. The same holds true in case of the substituent R or R'. The hydroxyl group on the aromatic ring may be present at any position relative to the substituent Y, i.e. the ortho, meta or para position.

Examples of the divalent phenol include:

bis(4-hydroxyphenyl)-methane,
bis(4-hydroxy-3-methylphenyl)-methane,
bis(4-hydroxy-3,5-dichlorophenyl)-methane,
bis(4-hydroxy-3,5-dibromophenyl)-methane,
bis(4-hydroxy-3,5-difluorophenyl)-methane,
bis(4-hydroxyphenyl)-ketone,
bis(4-hydroxyphenyl)-sulfide,
bis(4-hydroxyphenyl)-sulfone,
4,4'-dihydroxydiphenyl ether,
1,1-bis(4-hydroxyphenyl)-ethane,
2,2-bis(4-hydroxyphenyl)-propane,
2,2-bis(4-hydroxy-3-methylphenyl)-propane,
2,2-bis(4-hydroxy-3-chlorophenyl)-propane,
2,2-bis(4-hydroxy-3,5-dichlorophenyl)-propane,
2,2-bis(4-hydroxynaphthyl)-propane,
bis(4-hydroxyphenyl)-phenylmethane,
bis(4-hydroxyphenyl)-diphenylmethane,
bis(4-hydroxyphenyl)-4'-methylphenylmethane,
1,1-bis(4-hydroxyphenyl)-2,2,2-trichloroethane,
bis(4-hydroxyphenyl)-4'-chlorophenyl)-methane,
1,1-bis(4-hydroxyphenyl)-cyclohexane,
bis(4-hydroxyphenyl)-cyclohexylmethane,
4,4'-dihydroxydiphenyl,
2,2'-dihydroxydiphenyl,
2,6-dihydroxydinaphthalene,
hydroquinone,
resorcinol,
2,6-dihydroxytoluene,
2,6-dihydroxychlorobenzene,
3,6-dihydroxytoluene, etc.

These divalent phenols may be used alone or in combination.

The divalent phenol may be used in the form of a diester such as the dialkyl ester or diphenyl ester. Such diester derivatives may be also used alone or in combination.

The aromatic dibasic acid is represented by the following formula:

HOOC—Ar'—COOH wherein Ar' is arylene (e.g. o-phenylene, m-phenylene, p-phenylene, naphthylene) substituted or not with alkyl or halogen. The dibasic acids may be used alone or in combination.

The dibasic acid may be used in the form of the dichloride or diester such as the dialkyl ester or diphenyl ester. Such derivatives may be also used alone or in combination.

The preparation of the APC from the divalent phenol or its derivative and the aromatic dibasic acid or its derivative may be executed by interfacial condensation polymerization, solution condensation polymerization, melt condensation polymerization or the like.

The composition of the present invention may include any additives to be conventionally incorporated in SR such as dyestuffs, pigments, fillers, stabilizers and the like.

The composition of the invention can be uniformly blended by the solution blending method or by the aid of a conventional mixing machine such as two rolls, a Banbury mixer or an extruder.

The physical properties of the composition of the invention are varied depending on the mixing ratio of the components. When the amount of SR is larger, the resulting composition is considered as SR having an excellent resistance to heat deformation. On the contrary, when the amount of APC is larger, the resultant composition is regarded as APC which can be readily molded by a conventional molding machine, since the processability of APC is improved by the presence of SR.

Practical and presently preferred embodiments of the present invention are illustratively shown in the following examples wherein the Vicat softening point is determined as follows:

A test piece of 3 mm. in thickness is charged with a load of 1 kg, and the temperature is gradually raised at a rate of 0.8° C./min. When a needle penetrates into the test piece to the depth of 1 mm., the temperature is recorded as the Vicat softening point.

EXAMPLE 1

Acrylonitrile - styrene - butadiene copolymer (acrylonitrile content, 22% by weight; styrene content, 51% by weight; butadiene content, 27% by weight; density, 1.03) and APC having the following unit structure:

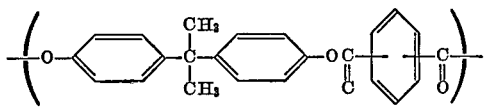

(p-substituted compound, 50 mol percent; m-substituted compound, 50 mol percent; intrinsic viscosity in chloroform determined at 25° C., 0.55 dl/g.) are dissolved in methylene chloride. After the solution is stirred well, methanol is added thereto. The precipitated powder is collected and press molded. The molded product is subjected to determination of the Vicat softening point. The results are shown in Table 1.

TABLE 1

| Mixing ratio (by weight) SR:APC: | Vicat softening point (° C.) |
|---|---|
| 100:0 | 97 |
| 70:30 | 110 |
| 50:50 | 136 |
| 30:70 | 168 |

From the above table, it is seen that the composition of the invention shows a much higher Vicat softening point than SR alone and thus possesses an excellent resistance to heat deformation.

EXAMPLE 2

A resin composition is prepared in the same manner as in Example 1 but using methyl methacrylate-styrene-butadiene copolymer (methyl methacrylate content, 30% by weight; styrene content, 40% by weight; butadiene content, 30% by weight; density, 1.07) and is press molded. The Vicat softening point of the molded product of the composition is determined. The results are shown in Table 2.

TABLE 2

| Mixing ratio (by weight) SR:APC: | Vicat softening point (° C.) |
|---|---|
| 100:0 | 87 |
| 70:30 | 150 |
| 50:50 | 172 |
| 30:70 | 181 |

From the above table, it is seen that the composition of the invention shows a much higher Vicat softening point that SR alone and thus possesses an excellent resistance to heat deformation.

EXAMPLE 3

Acrylonitrile-styrene copolymer (acrylonitrile content, 30% by weight; styrene content, 70% by weight; density, 1.07) and APC having the following unit structure:

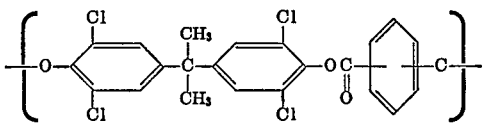

(p-substituted compound, 30 mol percent; m-substituted compound, 70 mol percent; intrinsic viscosity in m-cresol determined at 25° C., 0.70 dl/g.) are blended by a roll. The mixture is press molded, and the molded product is subjected to determination of the Vicat softening point. The results are shown in Table 3.

TABLE 3

| Mixing ratio (by weight) SR:APC: | Vicat softening point (° C.) |
|---|---|
| 100:0 | 107.7 |
| 10:90 | 195 |

From the above table, it is seen that the composition of the invention shows an excellent resistance to heat deformation.

EXAMPLE 4

Polystyrene having an impact strength (polybutadiene content, 7% by weight; styrene content, 93% by weight; density, 1.05) and APC having the following unit structure:

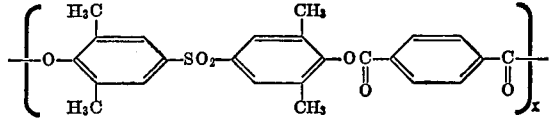

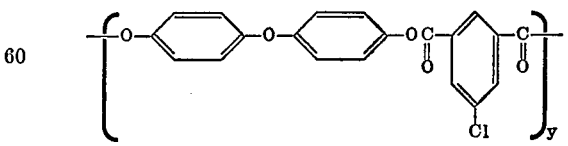

($x$, 20 mol percent; $y$, 80 mol percent; intrinsic viscosity in m-cresol determined at 25° C., 0.75 dl/g.) are blended by the solution blending method. The mixture is press molded, and the molded product is subjected to determination of the Vicat softening point. The results are shown in Table 4.

TABLE 4

| Mixing ratio (by weight) SR:APC: | Vicat softening point (° C) |
|---|---|
| 100:0 | 92.5 |
| 80:20 | 120.0 |

From the above table, it is seen that the composition of the invention shows an excellent resistance to heat deformation.

EXAMPLE 5

A resin composition is prepared in the same manner as in Example 4 but using APC having the following unit structure:

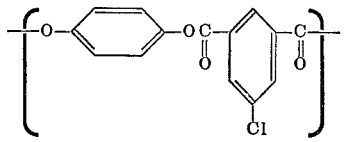

and is press molded. The molded product is subjected to determination of the Vicat softening point. The results are shown in Table 5.

TABLE 5

| Mixing ratio (by weight) SR:APC | Vicat softening point (° C) |
|---|---|
| 100:0 | 92.5 |
| 5:95 | Above 300 |

From the above table, it is seen that the composition of the invention shows an excellent resistance to heat deformation.

Comparative test

The Vicat softening point and tensile strength were measured for samples of polymethyl methacrylate (PMMA) (density, 1.18), polystyrene (density, 1.05) and acrylonitrile-butadiene-styrene resin (ABS) (acrylonitrile content, 22% by weight; butadiene content, 27% by weight; styrene content, 51% by weight; density, 1.03). The results are shown in Table 6, together with the corresponding results for compositions comprising each of the aforementioned components with a second component: each of these compositions contained 70 parts by weight of component 1 and 30 parts by weight of component 2. The polysulfone used is represented by the formula:

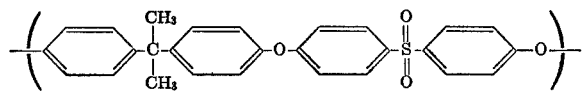

and has a heat distortion temperature of 174° C. (at 18.6 kg./cm.²). The component TPX is represented by the formula:

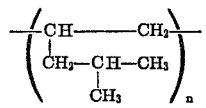

and has a heat distortion temperature of 180° C. (at 18.6 kg./cm.²).

TABLE 6

| No. 1 component | No. 2 component | Vicat softening point (° C.) |
|---|---|---|
| PMMA | | 111 |
| PMMA | TPX | 112 |
| Polystyrene | | 105 |
| Do | Polysulfone | 109 |
| Do | TPX | 108 |
| ABS | | 102 |
| ABS | TPX | 105 |

It may be seen from the results in Table 6 that the heat distortion resistance of polymethyl methacrylate is not materially improved by the addition of a polymeric component such as TPX, which itself has a higher heat distortion resistance. Similar effects are observed on adding the polysulfone to the polystyrene, or on adding the TPX to the polystyrene or the ABS resin.

What is claimed is:

1. A styrene resin composition resistant to heat deformation which comprises about 1 to 95% by weight of styrene resin selected from the group consisting of acrylonitrile-styrene copolymer, a graft copolymer obtained by graft copolymerizing styrene to a rubbery high polymer, a polystyrene composition comprising polystyrene and the rubbery high polymer, a graft copolymer obtained by graft copolymerizing styrene, acrylonitrile and/or methyl methacrylate to the rubbery high polymer and a resin composition comprising the rubbery high polymer and a styrene copolymer, the said rubbery high polymer being a rubbery copolymer of butadiene with styrene or acrylonitrile, a rubbery copolymer of ethylene and vinyl acetate or a rubbery copolymer of ethylene, propylene and diene or polybutadiene and the said styrene copolymer being acrylonitrile-styrene copolymer or methyl methacrylate-styrene copolymer, and about 99 to 5% by weight of a polyarylene ester, the said polyarylene ester being a polyester prepared from a divalent phenol and an aromatic dibasic acid, said percentages being based upon the total weight of the composition.

2. The styrene resin composition according to claim 1, wherein the polyarylene ester is present in said composition in an amount of about 15 to 95% by weight.

3. The styrene resin composition according to claim 1, wherein the divalent phenol has the formula:

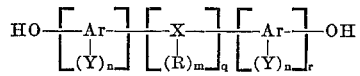

wherein Ar is an aromatic ring, R is hydrogen, alkyl, haloalkyl, haloaryl, aralkyl, haloaralkyl, alkyl-substituted aryl, alkyl-substituted haloaryl, cycloalkyl or halocycloalkyl, X is alkylene, alkylidene, a chain of two or more alkylenes or alkylidene linked through an aromatic ring, a t-amino group, an oxygen atom, a carbonyl group or a sulfur-containing group, an alicyclic group, a sulfur-containing group, an oxygen atom, a carbonyl group or a t-amino group, Y is halogen, nitro or the group represented by R' or OR' (R' being the same as R), $m$ is 0 or an integer not more than the number of hydrogen atoms replaceable on X, $n$ is 0 or an integer not more than the number of hydrogen atoms replaceable on Ar, $p$ is an integer of 1 or more, $q$ is 0 or 1 and R is 0 or an integer of 1 or more, $r$ being not 0 when $q$ is 1, or a diester derivative thereof, and the aromatic dibasic acid has the formula:

HOOC—Ar'—COOH wherein Ar' is arylene substituted or not with alkyl or halogen or a dichloride or diester derivative thereof.

References Cited

UNITED STATES PATENTS

| 3,239,582 | 3/1966 | Kesbkkula et al. | 260—873 |
| 3,655,824 | 4/1972 | Kato et al. | 260—873 |
| 3,663,471 | 5/1972 | Schirmer et al. | 260—873 |
| 3,704,279 | 11/1972 | Ismail | 260—47 C |

WILLIAM H. SHORT, Primary Examiner

E. WOODBERRY, Assistant Examiner

U.S. Cl. X.R.

260—47 R, 49, 876